United States Patent
Zhou et al.

(10) Patent No.: US 9,561,501 B2
(45) Date of Patent: Feb. 7, 2017

(54) PROCESS OF REACTIVATING A METAL CONTAMINATED BIOMASS CONVERSION CATALYST

(71) Applicant: KiOR, Inc., Pasadena, TX (US)

(72) Inventors: Ling Zhou, Houston, TX (US);
Victoria Samples, Houston, TX (US);
Gopal Juttu, League City, TX (US);
Hollie Craig, Baytown, TX (US);
Bruce Adkins, League City, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 30 days.

(21) Appl. No.: 14/596,902

(22) Filed: Jan. 14, 2015

(65) Prior Publication Data

US 2015/0202615 A1    Jul. 23, 2015

Related U.S. Application Data

(60) Provisional application No. 61/929,625, filed on Jan. 21, 2014.

(51) Int. Cl.

| | |
|---|---|
| *B01J 29/90* | (2006.01) |
| *B01J 38/66* | (2006.01) |
| *B01J 38/60* | (2006.01) |
| *B01J 38/62* | (2006.01) |
| *C10G 3/00* | (2006.01) |
| *B01J 29/06* | (2006.01) |

(52) U.S. Cl.
CPC ............... *B01J 38/66* (2013.01); *B01J 29/90* (2013.01); *B01J 38/60* (2013.01); *B01J 38/62* (2013.01); *C10G 3/44* (2013.01); *C10G 3/62* (2013.01); *B01J 29/06* (2013.01); *C10G 2300/1011* (2013.01); *C10G 2300/1014* (2013.01); *C10G 2300/70* (2013.01); *C10G 2400/02* (2013.01); *C10G 2400/04* (2013.01); *C10G 2400/06* (2013.01); *C10G 2400/08* (2013.01)

(58) Field of Classification Search
CPC ............. B01J 29/90; B01J 23/96; B01J 38/66; C01B 33/04
USPC .......................................................... 502/26
See application file for complete search history.

(56) References Cited

U.S. PATENT DOCUMENTS

| | | | |
|---|---|---|---|
| 3,252,918 A | 5/1966 | Desegna et al. | |
| 3,533,959 A | 10/1970 | Miale et al. | |
| 4,280,897 A | 7/1981 | Shah et al. | |
| 4,391,735 A * | 7/1983 | Busse | B01J 23/66 502/28 |
| 4,454,240 A | 6/1984 | Ganguli | |
| 4,461,845 A | 7/1984 | Dessau et al. | |
| 4,485,183 A | 11/1984 | Miller et al. | |
| 5,151,391 A | 9/1992 | Fu et al. | |
| 5,212,127 A | 5/1993 | Kocal et al. | |
| 5,738,222 A | 4/1998 | Pagenkopf et al. | |
| 5,928,980 A | 7/1999 | Gangwal et al. | |
| 2003/0187286 A1 | 10/2003 | Teles et al. | |
| 2004/0064006 A1 | 4/2004 | Beech et al. | |
| 2007/0004951 A1 | 1/2007 | Chen | |
| 2008/0154079 A1 | 6/2008 | Ellis et al. | |
| 2010/0076238 A1 | 3/2010 | Brandvold et al. | |
| 2010/0105970 A1 | 4/2010 | Yanik et al. | |
| 2010/0240523 A1 | 9/2010 | Hartenstein et al. | |
| 2010/0292073 A1 | 11/2010 | Quinones | |
| 2010/0294643 A1 | 11/2010 | O'Connor | |
| 2011/0283601 A1 | 11/2011 | Ditsch | |
| 2012/0022307 A1 | 1/2012 | Yanik et al. | |
| 2012/0047794 A1 | 3/2012 | Bartek et al. | |
| 2012/0090221 A1 | 4/2012 | Banasiak et al. | |
| 2012/0160658 A1 | 6/2012 | Bartek et al. | |
| 2012/0272565 A1 | 11/2012 | Bartek et al. | |
| 2013/0036660 A1 | 2/2013 | Woods et al. | |
| 2013/0136665 A1 | 5/2013 | Kim et al. | |
| 2013/0137913 A1 | 5/2013 | Chewter et al. | |
| 2013/0261355 A1 | 10/2013 | Stamires | |
| 2014/0007493 A1 | 1/2014 | Henry et al. | |
| 2014/0303414 A1 | 10/2014 | Mazanec et al. | |
| 2015/0004093 A1 | 1/2015 | Zhou et al. | |
| 2015/0045208 A1 | 2/2015 | Adkins et al. | |
| 2015/0051427 A1 | 2/2015 | Ramirez Corredores et al. | |

OTHER PUBLICATIONS

H. Beuther, et al., Technique for Removing Metal Contaminants from Catalysts, I&EC Product Research and Development, Division of Petroleum Chemistry, vol. 2, No. 1, Mar. 1963, pp. 53-57.
J. Yoo, Metal Recovery and Rejuvenation of Metal-loaded Spent Catalysts, Catalysis Today 44 (1998), 1998, pp. 27-46.
F. Elvin FCC Catalyst Demetallization, Catalyst Deactivation 1991, pp. 803-805.
S. K. Pavel, et al., Trace Elements of Petroleum—FCCU Feedstock, Fresh, Spent and Demetallized FCCU Catalyst Solids & Leachates; Demetallization Reduces Leachability, Increases Stability, Coastal Catalyst Technology, Inc., Houston, Texas, 1996, pp. 806-810.
M. Zhiqiang, et al., Deactivation and Regeneration of H-USY Zeolite During Lignin Catalytic Fast Pyrolysis, ChemCatChem, vol. 4, 2012, pp. 2036-2044.

* cited by examiner (Continued)

*Primary Examiner* — Edward Johnson
(74) *Attorney, Agent, or Firm* — John Wilson Jones (57) ABSTRACT

A metal contaminated spent catalyst or regenerated catalyst from a biomass conversion unit may be subjected to an ammonium wash in order to remove potassium. The ammonium wash may include ammonium sulfate, ammonium nitrate, ammonium hydroxide, ammonium acetate, ammonium phosphates, and mixtures thereof. Acidity and catalytic activity of the biomass conversion catalyst is restored by the removal of potassium contaminants.

22 Claims, 4 Drawing Sheets

PROCESS OF REACTIVATING A METAL CONTAMINATED BIOMASS CONVERSION CATALYST

This application claims the benefit of U.S. patent application Ser. No. 61/929,625, filed on Jan. 21, 2014, herein incorporated by reference.

FIELD OF THE DISCLOSURE

The disclosure relates to a process of reactivating or regenerating a metal contaminated spent catalyst or regenerated catalyst from a biomass conversion unit wherein at least a portion of the spent catalyst or regenerated catalyst is treated with an ammonium wash.

BACKGROUND OF THE DISCLOSURE

Renewable fuel sources may be obtained by converting a biomass feedstock into useful biofuels and/or specialty chemicals. For instance, a bio-oil containing stream may be produced by subjecting a biomass feedstock to fast pyrolysis, slow pyrolysis, liquefaction, gasification, enzymatic conversion or another chemical conversion reaction in the presence of a catalyst, such as zeolite, in a biomass conversion unit.

Chemically combined minerals as well as metals (calcium, potassium, magnesium, sodium, manganese, aluminum, silicon, chromium, iron, phosphorus, sulfur, etc.) from the biomass accumulate on the catalyst during the conversion reaction. This dramatically decreases the surface area and the micropore volume of the catalyst and markedly influences physical chemical properties and performance of the catalyst. Catalytic activity is therefore significantly decreased.

Among the metals which accumulate on the catalyst, potassium has been found to be distributed across and within the catalyst particles, in contrast to calcium and magnesium which are enriched in the external shell of the particles. Potassium can poison the acidic sites of a zeolite catalyst, leading to a significant decrease in catalytic activity. Typically, regeneration of such catalytic materials requires the removal of the metal contaminants by harsh demetallization chemicals. In addition, this process is carried out ex-situ from the reaction system, and requires shutting down of the reactor, unloading the spent catalyst and then transporting the spent catalyst to a chemical processing facility.

An alternative process is needed for removing potassium from a metal contaminated catalyst used in a biomass conversion process by reactivating the catalyst. Such alternatives would desirably be conducted under milder conditions than those presently offered and render restoration of the physical chemical properties of the catalyst.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment of the disclosure, a process of reactivating a metal contaminated spent catalyst or regenerated catalyst from a biomass conversion unit is provided wherein the metal contaminated spent catalyst or regenerated catalyst is subjected to an ammonium wash. Potassium is then removed from the metal contaminated spent catalyst or regenerated catalyst.

In another embodiment, a process of restoring acidity to a metal contaminated catalyst from a biomass conversion unit is provided. In the process, at least a portion of the metal contaminated catalyst is subjected to an ammonium wash solution. Acidity is thereby restored to the catalyst.

In another embodiment of the disclosure, a process of reactivating a metal contaminated spent zeolite catalyst or a regenerated zeolite catalyst from a biomass conversion unit is provided wherein the metal contaminated spent zeolite catalyst or regenerated zeolite catalyst is subjected to an ammonium wash. Potassium from the metal contaminated spent catalyst or regenerated catalyst is then removed to render a re-activated zeolite catalyst. The surface area, pore volume and/or bulk density of the resulting metal contaminated spent zeolite catalyst or regenerated zeolite catalyst is substantially the same as the surface area, pore volume and/or bulk density of the re-activated zeolite catalyst.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

The present disclosure includes features and advantages which are believed to enable it to advance the reactivation or regeneration of a metal contaminated catalyst from a biomass conversion unit.

Characteristics and advantages of the present disclosure described above and additional features and benefits will be readily apparent to those skilled in the art upon consideration of the following detailed description of various embodiments and referring to the accompanying drawings. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements may be referenced with like or identical reference numerals or are apparent from the figures and/or the description herein.

Certain terms are used herein and in the appended claims to refer to particular components or steps. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The metal contaminated catalyst subjected to the reactivation process disclosed herein may be a spent catalyst. The spent catalyst forms in the biomass conversion unit from the accumulation of metals, including potassium, from the biomass in the catalyst inventory.

Alternatively, the metal contaminated catalyst subjected to the re-activation process may be an equilibrium catalyst ("E-cat"), also referred to as biomass conversion unit equilibrium catalyst ("ECAT"). Such catalysts are produced by burning coke deposits from a spent catalyst in oxygen or an oxygen containing gas, such as air, in a catalyst regeneration unit or regenerator. All or a portion of the spent catalyst formed in the biomass conversion unit may be subjected to treatment.

Washing of the contaminated spent catalyst or contaminated regenerated catalyst from the biomass conversion unit removes potassium from the catalyst particles. Washing of the contaminated spent or regenerated catalyst proceeds under mild conditions with an ammonium wash. Suitable washes include those containing ammonium sulfate, ammonium nitrate, ammonium hydroxide, ammonium acetate, and ammonium phosphates, as well as combinations thereof.

Removal of potassium further restores the acidity to the catalyst. Decreased acidity of the catalyst may be attributable to the presence of potassium in the pores of the contaminated spent or regenerated catalyst. The potassium in the contaminated spent catalyst or contaminated regenerated catalyst neutralizes the acid sites of the catalyst. Thus, restoring the acidity to the catalyst requires the removal of potassium from the pores of the catalyst; the potassium having poisoned the catalyst prior to treatment of the biomass in the biomass conversion reactor.

In an embodiment, the catalyst treated in the process disclosed herein may be a combination of the contaminated spent catalyst and contaminated regenerated catalyst. Alternatively, the catalyst treated in the process disclosed herein may be just the contaminated spent catalyst or the contaminated regenerated catalyst.

Removal of potassium from the contaminated spent or regenerated catalyst further restores acidity to the re-activated catalyst. Such restoration of acidity may be attributable in part to the ion exchange of potassium with the ammonium cation of the ammonium wash and the subsequent calcination at elevated temperatures of the exchanged ammonium ion into an acidic proton. Removal of potassium from the pores of the catalyst restores acidity of the catalyst; the acidity having been decrease by the presence of potassium within the pores of the catalyst. Treatment of the contaminated catalyst with the ammonium wash restores the activity of the original catalyst (prior to being subjected to the biomass conversion treatment) since active sites on catalyst are re-activated by the removal of potassium from the catalyst.

Typically, the pH of the ammonium wash is from neutral to slightly basic and typically is between from about 5.0 to about 9.0, more typically from about 6.0 to about 9.0. Such pH conditions provide the highest ammonium concentration in the wash.

Typically, physical properties (such as surface area, bulk density, and pore volume) are changed slightly, if at all, by an ammonium wash at neutral conditions, between from about 6.0 to about 8.0. Changes of the catalyst physical properties have been observed when using an ammonium wash having a pH of about 7.0 to about 9.0.

All or a portion of the potassium may be removed during the process. The resulting catalyst, referred to as the re-activated catalyst, may then be reused in a biomass conversion unit, optionally with fresh biomass conversion catalyst.

The reactivation process defined herein may further include pre-treatment or post-treatment or both pre-treatment and post-treatment with an acid wash. The acid wash is optionally used in order to disperse or disassociate contaminant metals from the spent catalyst and/or regenerated catalyst (E-cat). The acid wash removes little, if any, potassium from the spent or regenerated catalyst. The acid wash, instead of reactivating the catalyst, rejuvenates the catalyst by opening up the pores of the catalyst and disassociating the metals from the pores. Metals, especially potassium, however, are not leached out of the pores. The use of an ammonium wash therefore selectively leaches the potassium from the contaminated spent catalyst or contaminated regenerated catalyst.

The spent catalyst and/or regenerated catalyst is typically subjected to the acid wash when the micropore volume or micropore surface area of the spent or regenerated catalyst has been reduced in more than 50% of the micropore volume or micropore surface area of the fresh biomass cracking catalyst.

The process of rejuvenation is typically achieved when the micropore volume or the micropore surface area of the rejuvenated catalyst is at least 80% of the micropore volume or the micropore surface area of the fresh biomass cracking catalyst. In many instances, the micropore volume or the micropore surface area of the rejuvenated catalyst is close to 100% and in some cases even higher.

Thus, with the optional acid wash, metals are dispersed or disassociated away from the original location of the contaminant on the surface of the catalyst particles. It is possible, however, that the contaminant may still be on the surface of the catalyst particle after completion of the acid wash since mild acid washing does not typically remove any significant portion of the contaminant metals. The metals dispersed or disassociated from the catalyst particles from the acid wash affect the physical properties of the catalyst such as pore volume and surface area. As such, the micropore volume of the catalyst may be recovered by dispersing or disassociating the metals which blocked the pores. Such metals may include calcium, magnesium, sodium, manganese, potassium, aluminum, silicon, chromium, and iron. In contrast to the action of the acid wash, the ammonium wash disclosed herein removes potassium from the catalyst particles. In an embodiment, potassium inside the micropores of the catalyst is removed to recover the active sites.

The acid wash may contain one or more inorganic acids, one or more organic acids or a mixture thereof. The acid wash may comprise the treatment of the contaminated spent or regenerated catalyst as set forth in U.S. patent application Ser. No. 13/932,794, filed on Jul. 1, 2013, herein incorporated by reference. The acid of the acid wash may be inorganic acid such as one or more acids selected from nitric acid, sulfuric acid, phosphoric acid, hydrochloric acid, as well mixtures thereof. The acid may further be one or more organic acids such as acetic acid, propionic acid, oxalic acid, uronic acid, tartaric acid, humic acid, maleic acid, citric acid, butyric acid and ascorbic acid and mixtures thereof. Alternatively, one or more inorganic acids and one or more organic acids may be used as the acid of the acid wash. In an embodiment, the acid wash is a 0.01M to 1.0M acid solution containing the treatment acid. Other strengths of acid may be used though it is preferred that the acid wash be a weak acid solution of the treatment acid.

The acid wash may occur prior to the ammonium wash, subsequent to the ammonium wash or simultaneously with the ammonium wash. Where the acid wash is simultaneously applied with the ammonium wash, the pH of the ammonium wash is between from about 3 to about 7.0.

The process described herein of rejuvenating and reactivating the spent and/or regenerated catalyst may be repeated multiple times and thus allows for multiple reactivations of the biomass conversion catalyst.

Reactivation of the contaminated spent catalyst and/or contaminated regenerated catalyst may occur in a reactivation unit which is not integrated with the biomass conversion unit. Thus, for instance, the reactivation unit may not share a direct or indirect flow line with the biomass conversion unit. Alternatively, reactivation of the spent catalyst and/or regenerated catalyst may occur off site from the biomass conversion unit.

In another embodiment, reactivation of the spent catalyst and/or regenerated catalyst may be integrated with the biomass conversion unit. In this embodiment, the contaminated spent catalyst and/or regenerated catalyst may be re-activated in line (in-situ) with the biomass conversion unit wherein one or more flow lines from the biomass conversion unit are fed directly into the reactivation unit or indirectly into the reactivation unit. Since the biomass conversion unit and reactivation unit constitute an integrated biomass treatment unit, distinct advantages are offered to the operator. Most notably, the process disclosed herein results in less downtime, lower environmental impact, lower reactor temperatures, and longer cycle lengths of the biomass conversion unit.

Likewise, where it is desired to apply an acid wash to the contaminated catalyst, the contaminated spent catalyst and/or regenerated catalyst may be rejuvenated.

In another embodiment, rejuvenation of the spent catalyst and/or regenerated catalyst may be integrated with the biomass conversion unit. In this embodiment, the spent catalyst and/or regenerated catalyst may be rejuvenated in line (in-situ) with the biomass conversion unit wherein one or more flow lines from the biomass conversion unit are fed directly into the rejuvenation unit or indirectly into the rejuvenation unit. Since the biomass conversion unit and rejuvenation unit constitute an integrated biomass treatment unit, distinct advantages are offered to the operator. Most notably, the process disclosed herein results in less downtime, lower environmental impact, lower reactor temperatures, and longer cycle lengths of the biomass conversion unit.

In an embodiment, rejuvenation of the spent catalyst and/or regenerated catalyst may occur in a rejuvenation unit which is not integrated with the biomass conversion unit. Thus, for instance, the rejuvenation unit may not share a direct or indirect flow line with the biomass conversion unit. Alternatively, rejuvenation of the spent catalyst and/or regenerated catalyst may occur off site from the biomass conversion unit.

In another embodiment, reactivation and/or rejuvenation of the spent catalyst and/or regenerated catalyst may be integrated with the bio-oil separation and recovery units as well as the biomass conversion unit. In this embodiment, the contaminated spent catalyst and/or regenerated catalyst may be re-activated and/or rejuvenated in-situ with the biomass conversion unit and the bio-oil separation and recovery units wherein one or more flow lines from the bio-oil separation and recovery unit and the biomass conversion unit are fed directly into the reactivation and/or rejuvenation unit or indirectly into the reactivation and/or rejuvenation unit.

In an embodiment, the catalyst subjected to the rejuvenation process disclosed herein may comprise a solid acid, such as a zeolite. Examples of suitable zeolites include ZSM-5, mordenite, beta, ferrierite, and zeolite-Y. Additionally, the catalyst may comprise a super acid. Examples of suitable super acids include sulfonated, phosphated, or fluorinated forms of zirconia, titania, alumina, silica-alumina, and/or clays.

In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof.

In yet another embodiment, the catalyst can also comprise alumina.

Rejuvenation and reactivation of the spent catalyst and/or regenerated catalyst does not appreciably affect the active metal elements on the catalyst or the support of the catalyst.

The biomass contains mineral metals which may include calcium, magnesium, sodium, manganese, potassium, aluminum, silicon, chromium, and iron. Such mineral metals accumulate in the catalyst inventory during treatment of the biomass in the biomass conversion unit and are deposited onto the catalyst. In addition to being deposited onto the catalyst, potassium may be deposited within the micropores of the catalyst. Thus, micropores of the catalyst may be plugged by such deposits in the biomass conversion unit. During rejuvenation, potassium may be removed, dispersed or disassociated from the spent catalyst or regenerated catalyst.

The biomass may be in a solid or finely divided form or may be a liquid. The biomass may be in the form of fibrous solid particles, such as cellulosic materials. Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, wood slag, saw dust, pulping waste, bark, and tree branches; agricultural waste such as corn stover, wheat straw, and bagasse; and/or energy crops such as eucalyptus, switch grass, and coppice; as well as municipal water, such as yard waste, paper and cardboard. The biomass may also be lignins or hemicelluloses.

In the biomass conversion unit, the biomass may be subjected to any of a variety of conversion reactions in order to produce bio-oil. Such conversion reactions include fast pyrolysis, slow pyrolysis, liquefaction, catalytic gasification, thermocatalytic conversion, etc. Biomass conversion unit may include, for example, a fluidized bed reactor, a cyclone reactor, an ablative reactor, or a riser reactor. In a biomass conversion unit, solid biomass particles may be agitated, for example, to reduce the size of particles. Agitation may be facilitated by a gas including one or more of air, steam, flue gas, carbon dioxide, carbon monoxide, hydrogen, and hydrocarbons such as methane. The agitator further be a mill (e.g., ball or hammer mill) or kneader or mixer.

Typically, the biomass conversion unit is operated at temperatures in excess of 450° C. In some conversion reactions, such as fast pyrolysis, where the biomass is exposed to short contact times and rapid heating, reaction temperatures may be as high as 1,000° C.

Figure 1:
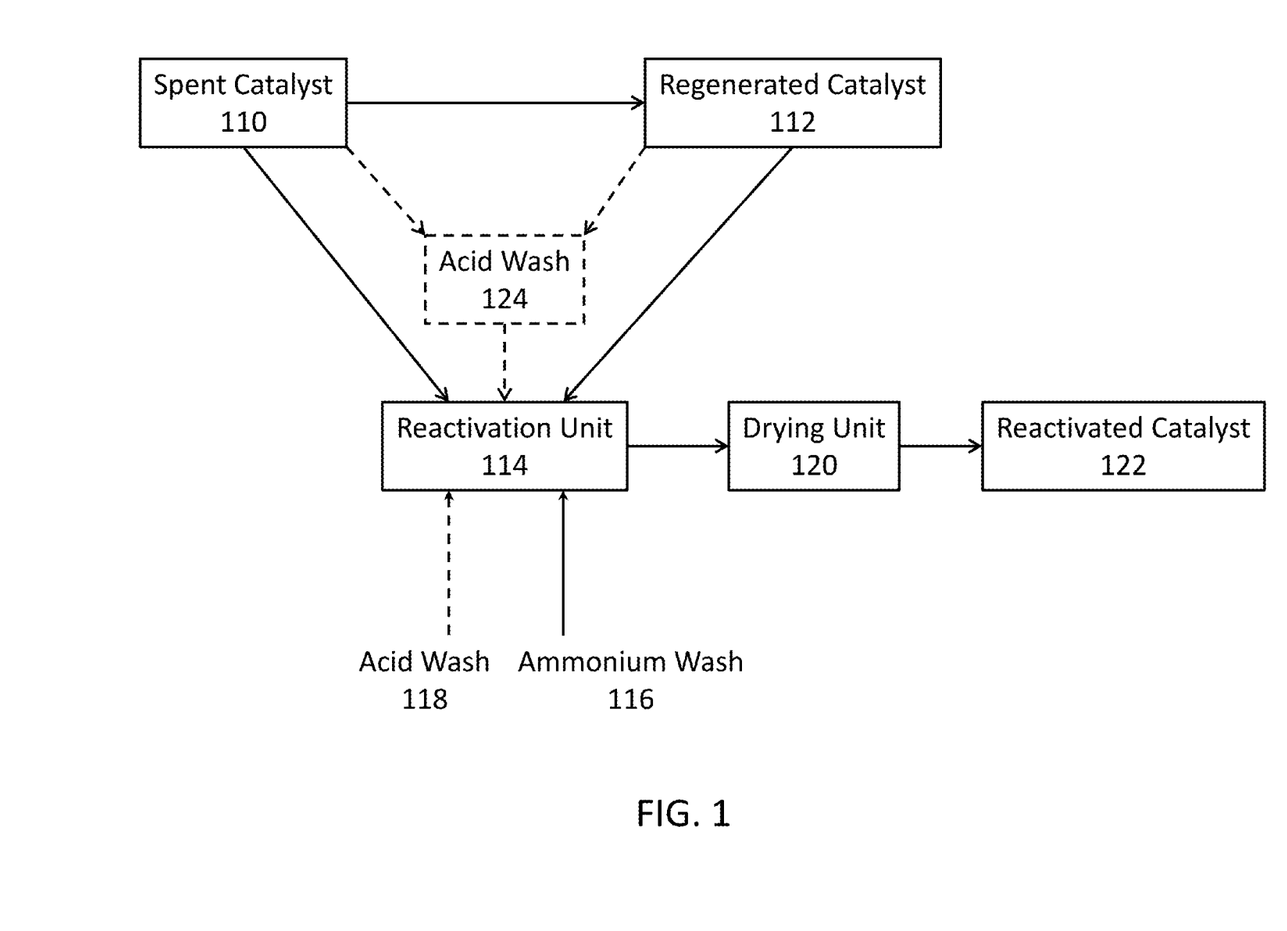
FIG. 1 illustrates a process of reactivating a metal contaminated spent catalyst and/or metal contaminated regenerated catalyst using an ammonium wash.

FIG. 1 depicts a process for reactivating a metal contaminated spent catalyst 110 and optionally metal contaminated regenerated catalyst 112 (E-cat). The biomass conversion unit may be integrated with the reactivation unit 114 or the reactivation unit may be located remotely from the biomass conversion unit. The remote location may be off site from where the biomass conversion unit is located or in closer proximity, though not integrated, with the biomass conversion unit. If on site, the process could be integrated with the biomass conversion unit.

As depicted, spent catalyst 110 obtained from a biomass conversion unit may optionally be introduced into catalyst regeneration unit where coke may be burned from the spent catalyst in oxygen or an oxygen containing gas, such as air, to render regenerated catalyst 112. The metal contaminated spent catalyst 110 and/or metal contaminated regenerated catalyst 112 may be mildly washed with an ammonium wash by introducing ammonium wash 116 into a line feeding into reactivation unit 114. The ammonium wash removes potassium from the spent and/or regenerated catalyst in reactivation unit 114.

In the reactivation unit, spent catalyst 110 and/or regenerated catalyst 112 may be optionally be subjected to acid wash. As illustrated, acid wash 124 may occur prior to introduction of spent catalyst 110 and/or regenerated catalyst 112 into reactivation unit 114. Contaminant metals are disassociated or dispersed from the spent catalyst and/or regenerated catalyst when subjected to the acid wash. Acid wash may also be fed through line 118 into reactivation unit 114. While FIG. 1 illustrates acid wash 118 being optionally added to the reactivation unit 114, the ammonium wash and acid wash may be mixed together prior to being introduced into reactivation unit 114.

The ammonium wash 116 may contain ammonium sulfate, ammonium nitrate, ammonium hydroxide, ammonium acetate, or ammonium phosphates, as well as combinations thereof. The ammonium wash is introduced into the reactivation unit 114 ex-situ, i.e. the ammonium wash not being a by-product produced in-situ with the biomass conversion system. The optional acid solution introduced into the reactivation may contain an inorganic acid such as nitric acid, sulfuric acid, phosphoric acid, hydrochloric acid, or a mixture thereof or an organic acid.

After being re-activated in reactivation unit 114, the catalyst may be dried in drying unit 120 prior to being introduced into a biomass conversion unit. Drying unit 120 may be a conventional dryer, such as rotary, conveyor, flash, belt dryer and the treated catalyst may be subjected to a relatively quick drying stage to reduce water content. Re-activated catalyst 122 may optionally be mixed with fresh catalyst for processing biomass in the biomass conversion unit.

Figure 2:
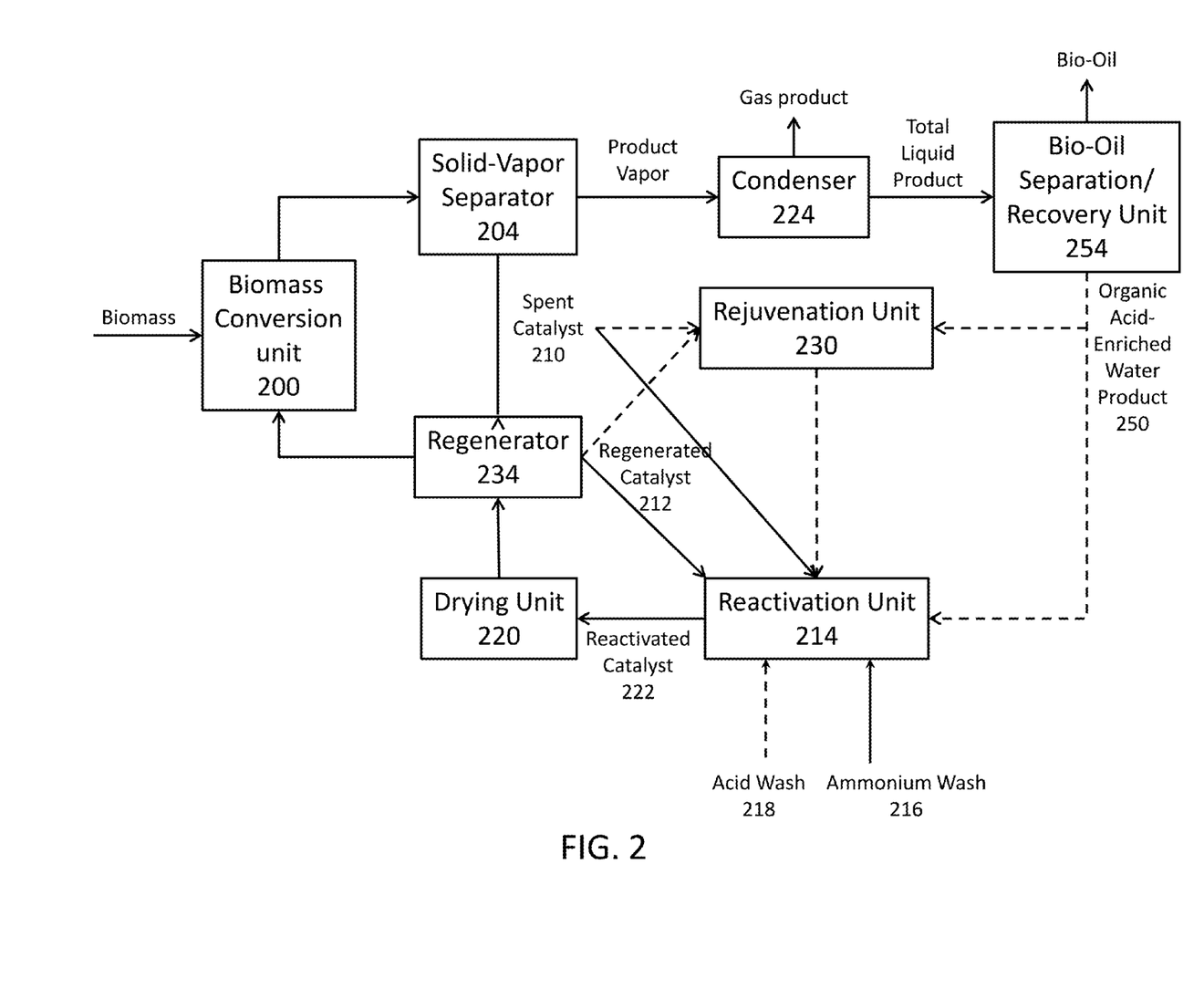
FIG. 2 illustrates an embodiment of the disclosure wherein a metal contaminated spent catalyst and/or metal contaminated regenerated catalyst is re-activated by use of an ammonium wash and an optional acid wash wherein the acid of the acid wash originates in a system which is integrated with a biomass conversion unit and the catalyst reactivation unit.

FIG. 2 illustrates an embodiment of the disclosure wherein a stream constituting the acid wash introduced into the reactivation unit 214 may originate in a bio-oil separation and recovery unit 254. As such, the acid stream may be integrated (in-situ) with the biomass conversion unit 200 and reactivation unit 214 may be integrated with the bio-oil separation and recovery unit 254 and the biomass conversion unit 200.

As illustrated, biomass is first introduced into biomass conversion unit 200 which contains biomass conversion catalyst. Conversion effluent from biomass conversion unit 200 may then be fed into solid-vapor separator 204. Solid-vapor separator 204 may be any conventional device capable of separating solids from gas and vapors such as a cyclone separator, a gas filter, or combinations thereof. In solid-vapor separator 204, a substantial portion of solids (e.g., spent catalysts, char, and/or heat carrier solids) are removed from the conversion effluent. As shown in FIG. 2, all or part of spent catalyst 210 may be introduced into reactivation unit 214. Alternatively, a portion of the contaminated spent catalyst 210 may be rejuvenated in catalyst rejuvenation unit 230, and then be introduced into reactivation unit 214.

As illustrated, all or part of spent catalyst 210 is introduced into catalyst regenerator 234, where coke may be burned from the spent catalyst in oxygen or an oxygen containing gas, such as air, to render regenerated catalyst 212. All or part of the regenerated catalyst 212 may then be introduced into reactivation unit 214. Alternatively, a portion of the contaminated regenerated catalyst 212 may be rejuvenated in catalyst rejuvenation unit 230, and then be introduced into reactivation unit 214.

The metal contaminated spent catalyst 210 or the metal contaminated regenerated catalyst 212 or a mixture of the two is mildly washed with an ammonium wash by introducing ammonium wash through line 216 into reactivation unit 214. Optionally, wash containing an inorganic acid may also be fed through line 218 into reactivation unit 214. In an embodiment (not shown) the ammonium wash and the acid wash may be mixed and introduced into reactivation unit 214 through a single feed line. The acid of the acid wash may contain an inorganic acid such as one or more acids selected from nitric acid, sulfuric acid, phosphoric acid, hydrochloric acid, as well mixtures thereof. The acid of the acid wash may contain an organic acid such as acetic acid, propionic acid, oxalic acid, uronic acid, tartaric acid, humic acid, maleic acid, citric acid, butyric acid and ascorbic acid and mixtures thereof.

The re-activated catalyst 222 may be fed into drying unit 220 and dried; the dried re-activated catalyst may then be fed into biomass conversion unit 200 via regenerate 234.

In an alternative, fresh catalyst may optionally be added into the biomass conversion unit 200 via regenerator 234 as well in order to attain desired activity of the catalyst within the reactor.

In FIG. 2, an optional embodiment of the disclosure is illustrated wherein reactivation unit 214 may be integrated with the bio-oil separation and recovery unit 254 as well as the biomass conversion unit 200. As illustrated, biomass is first introduced into biomass conversion unit 200 which contains biomass conversion catalyst. Conversion effluent from biomass conversion unit may then be fed through a flow line into solid-vapor separator 204. Solid-vapor separator 204 may be any conventional device capable of separating solids from gas and vapors such as a cyclone separator, a gas filter, or combinations thereof. In solid-vapor separator 204, a substantial portion of solids (e.g., spent catalysts, char, and/or heat carrier solids) are removed from the conversion effluent. Spent catalyst containing solid particles recovered in solid-vapor separator 204 may be introduced into catalyst regenerator 234 where the catalyst may be subjected to combustion. After regeneration, a portion of the hot regenerated catalyst 212 may then be introduced directly into reactivation unit 214. Alternatively, a portion of the regenerated catalyst 212 may be rejuvenated in catalyst rejuvenation unit 230, and then be introduced into reactivation unit 214.

The substantially solids-free product vapor separated in solid-vapor separator 204 may then be introduced into condenser 224 and be quenched. Non-condensable gas products are separated from a total liquid product stream which contains bio-oil; the latter being condensed or partially condensed from vapors in condenser 224.

The total liquid product stream may then be subjected to various bio-oil separation and recovery steps such as fractionation, decanting, centrifugation, desalting, extraction, phase separation, adsorption, reverse osmosis, deoxygenation and hydrotreatment. Organic liquid products containing bio-oil are separated from produced organic acid enriched water in such processes.

For instance, the total liquid product stream may be fed into one or more hydrotreaters in order to remove oxygen from the bio-oil containing stream. The resulting hydrotreated bio-oil stream may then be introduced into a fractionator where and separated into a naphtha fraction, a bio-distillate fraction and a bio-gas oil fraction. Suitable systems to be used in the fractionator include, for example, vacuum distillation, wiped film evaporation, fractional distillation, heated distillation, extraction, membrane separation, partial condensation, and/or non-heated distillation.

The organic acids in the produced acidic water may originate from the biomass feedstream or be a by-product of a chemical reaction occurring within any of the bio-oil separation or recovery units. Such organic acids may include formic, acetic acid, propionic acid, uronic, humic, benzoic as well as mixtures thereof.

The organic acid enriched water may be fed through flow line 250 into reactivation unit 214 and used as an acid wash. Alternatively, the organic acid enriched water may be fed into rejuvenation unit 230 and used as an acid wash. An external source (i.e., not integrated with either the biomass conversion unit or the bio-oil separation and recovery unit) of a second acid (inorganic or organic) may optionally be fed into flow line 218. Due to costs, such second acids are typically an inorganic acid though organic acids may be used as well. Preferably, such second acids may be an inorganic acid such as nitric acid, sulfuric acid, phosphoric acid, hydrochloric acid, as well as mixtures thereof or an organic acid such as acetic acid, propionic acid, oxalic acid, uronic acid, tartaric acid, humic acid, maleic acid, citric acid, butyric acid and ascorbic acid and mixtures thereof.

The acid wash thus removes, disperses or disassociates metals from the spent catalyst and/or regenerated catalyst. The ammonium wash removes potassium from the spent and/or regenerated catalyst and, in the process, restores acidity to the spent catalyst and/or regenerated catalyst. The re-activated catalyst is then dried in drying unit 220, and preferably fed into the biomass conversion unit 200 via regenerator 234. In this manner, fresh catalyst added to biomass conversion unit 200 and the re-activated catalyst are heated and thoroughly mixed with the catalyst inventory.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or process of operation. Any one or more of the above components, features and processes may be employed in any suitable configuration without inclusion of other such components, features and processes. Moreover, the present disclosure includes additional features, capabilities, functions, process, uses and applications that have not been specifically addressed herein but are, or will become, apparent from the description herein, the appended drawings and claims.

All percentages set forth in the Examples are given in terms of weight units except as may otherwise be indicated.

EXAMPLES

Example 1

Figure 3:
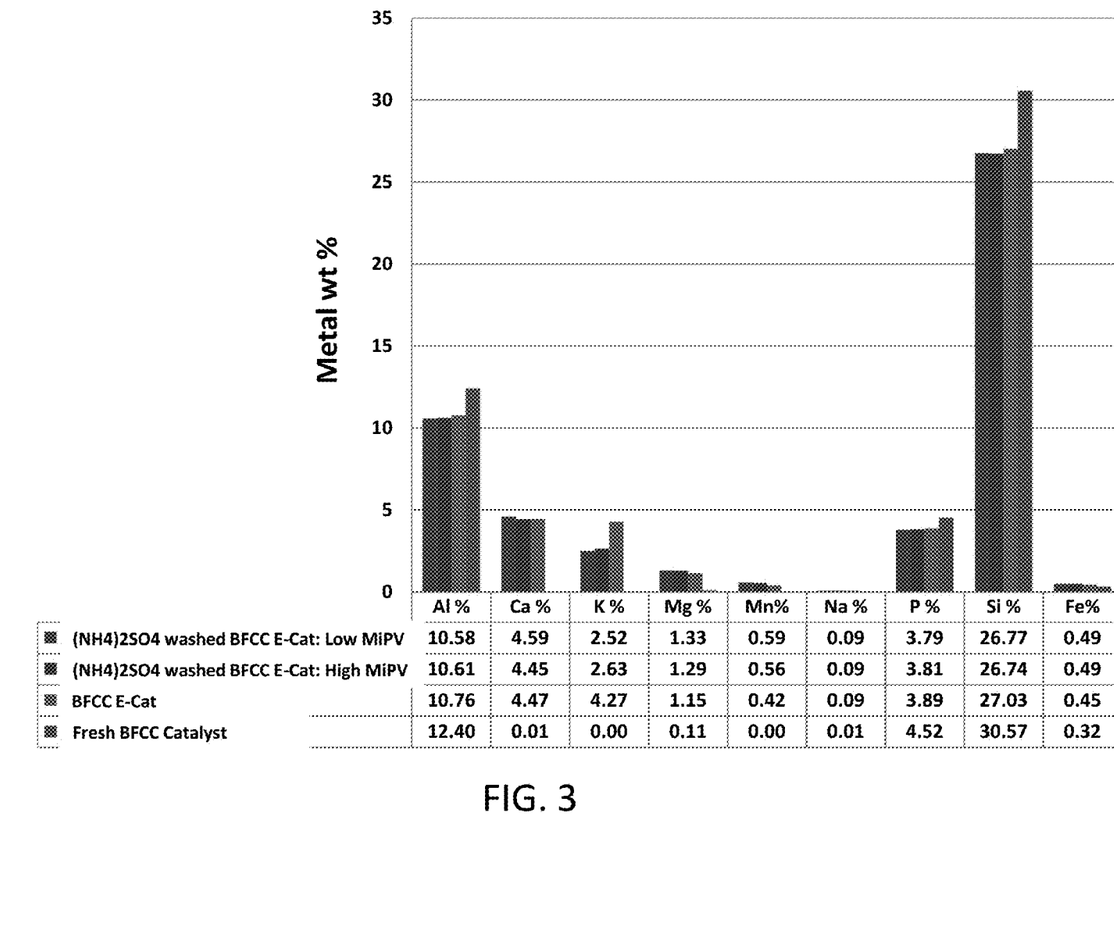
FIG. 3 demonstrates the decrease in potassium content of a metal contaminated regenerated catalyst when subjected to an ammonium wash.

A regenerated catalyst (E-cat) was generated by burning off coke from a spent zeolitic catalyst. The spent catalyst was used in a thermocatalytic biomass conversion unit used to convert a lignocellulosic material into a bio-oil containing feedstream. The regenerated catalyst was then subjected to an ammonium sulfate wash at pH 6 and 3. The wash solvent contained 1M ammonium sulfate. The regenerated catalyst was washed in the ammonium-solution for about 60 minutes. The amount of metals in the E-Cat washed with the ammonium sulfate solution, the original E-Cat, and fresh zeolitic catalyst is set forth in FIG. 3. FIG. 3 summarizes the change in metal weight percent between untreated E-Cat, treated E-Cat at pH of 6 having a low micropore volume (MiPV), treated E-Cat at pH of 3 having a high MiPV, and fresh catalyst and shows up to 41% decrease of potassium from the ammonium washed E-Cats. Further, FIG. 3 shows that the level of non-potassium metals is essentially unchanged by subjecting the E-cat to an ammonium wash. By restoring the acidity of the zeolite catalyst, the catalytic activity is significantly recovered in the biomass conversion process.

Example 2

Figure 4:
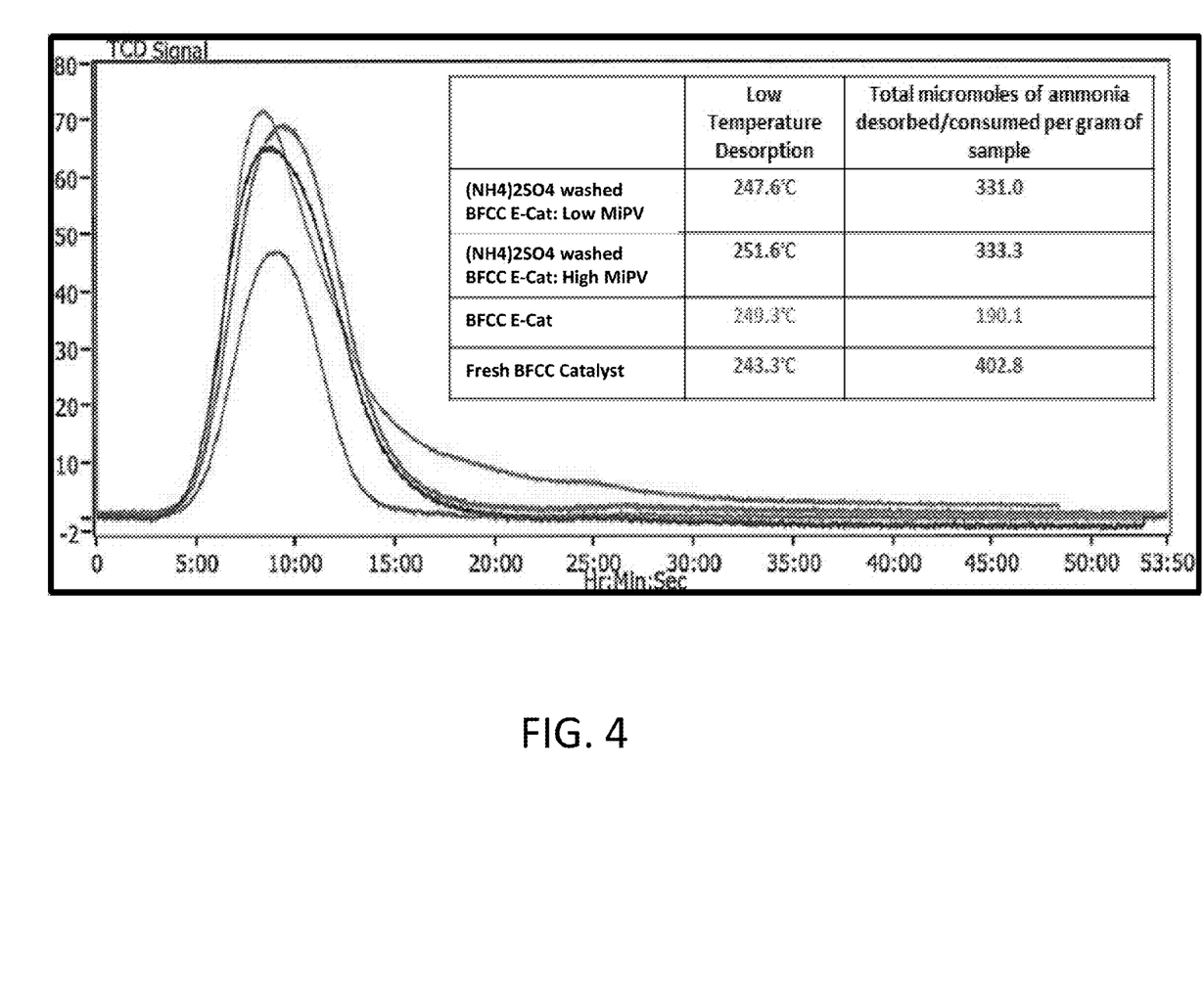
FIG. 4 demonstrates the restoration of acidity of a metal contaminated regenerated catalyst when subjected to an ammonium wash.

The catalysts of Example 1 were analyzed in order to measure the total acidity of the catalyst. A temperature program desorption ($NH_3$-TPD) curve was generated for the catalysts disclosed in Example 1. Ammonia was saturated onto the catalyst in order to neutralize the total acid sites on the catalyst. The catalyst was then quickly heated and the amount of desorption of ammonia from acid sites of the catalyst was determined. The curve shown in FIG. 4 illustrates the amount of ammonia desorbed or consumed as determined by TPD, the y axis being the total desorbed ammonia from the catalyst and the x axis representing the desorption temperatures that is proportional to time. The $NH_3$-TPD data clearly demonstrates the restoration of the acidity of the BFCC E-Cat after ammonium wash regardless of change in catalyst physical properties.

The process that may be described above or claimed herein and any other processes which may fall within the scope of the appended claims can be performed in any desired suitable order and are not necessarily limited to any sequence described herein or as may be listed in the appended claims. Further, the process of the present invention does not necessarily require use of the particular embodiments shown and described herein, but are equally applicable with any other suitable structure, form and configuration of components.

While exemplary embodiments of the invention have been shown and described, many variations, modifications and/or changes of the system, apparatus and process of the present invention, such as in the components, details of construction and operation, arrangement of parts and/or process of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A process of reactivating a metal contaminated spent catalyst or regenerated catalyst from a biomass conversion unit comprising subjecting the metal contaminated spent catalyst or regenerated catalyst to an ammonium wash and removing potassium from the contaminated spent catalyst or regenerated catalyst.

2. The process of claim 1, wherein the ammonium wash contains a member selected from the group consisting of ammonium sulfate, ammonium nitrate, ammonium hydroxide, ammonium acetate, ammonium phosphates, and mixtures thereof.

3. The process of claim 1, wherein the metal contaminated spent catalyst or regenerated catalyst is further subjected to treatment with an acid solution comprising an inorganic acid or an organic acid or a mixture thereof.

4. The process of claim 3, wherein subsequent to subjecting the metal contaminated spent catalyst or regenerated catalyst with the ammonium wash, the spent catalyst or regenerated catalyst is treated with the acid solution.

5. The process of claim 3, wherein prior to subjecting the metal contaminated spent catalyst or regenerated catalyst with the ammonium wash, the spent catalyst or regenerated catalyst is treated with the acid solution.

6. The process of claim 3, wherein the metal contaminated spent catalyst or regenerated catalyst is treated with the acid solution simultaneously with the ammonium wash.

7. The process of claim 1, wherein the spent catalyst or regenerated catalyst comprises zeolite.

8. The process of claim 1, wherein the catalyst being re-activated is a regenerated catalyst.

9. The process of claim 1, wherein the catalyst being re-activated is a spent catalyst.

10. The process of any of claim 3, wherein the acid solution comprises an inorganic acid.

11. The process of claim 10, wherein the inorganic acid is selected from the group consisting of nitric acid, sulfuric acid, phosphoric acid, hydrochloric acid, and mixtures thereof.

12. The process of claim 3, wherein the acid solution comprises an organic acid.

13. The process of claim 12, wherein the acid is within an organic acid enriched water stream and further wherein (i) the organic acid enriched water stream is separated from bio-oil in a bio-oil separation and recovery unit and (ii) the bio-oil separation and recovery unit is integrated in-situ with the biomass conversion unit.

14. The process of claim 3, wherein the acid wash disperses or disassociates from the spent catalyst or regenerated catalyst at least one metal selected from the group consisting of calcium, magnesium, sodium, manganese, aluminum, silicon, chromium and iron.

15. The process of claim 12, wherein the organic acid is selected from the group consisting of acetic acid, propionic acid, oxalic acid, uronic acid, tartaric acid, humic acid, maleic acid, citric acid, butyric acid and ascorbic acid and mixtures thereof.

16. The process of claim 15, wherein the organic acid is selected from the group consisting of acetic acid and propionic acid and mixtures thereof.

17. The process of claim 1, wherein a biomass treated in the biomass conversion unit comprises a lignocellulosic material.

18. The process of claim 1, wherein reactivation of the metal contaminated spent catalyst or regenerated catalyst occurs in a reactivation unit, the re-activation unit being integrated in-situ with the biomass conversion unit.

19. The process of claim 1, wherein reactivation of the metal contaminated spent catalyst or regenerated catalyst occurs in a reactivation unit, the re-activation unit being located ex-situ from the biomass conversion unit.

20. A process of restoring acidity to a metal contaminated catalyst from a biomass conversion unit, the process comprising:
(a) subjecting at least a portion of the metal contaminated catalyst to an ammonium wash solution; and
(b) restoring acidity to the catalyst.

21. The process of claim 20, wherein the metal contaminated catalyst comprises zeolite.

22. A process of re-activating a metal contaminated spent zeolite catalyst or a regenerated zeolite catalyst from a biomass conversion unit comprising:
(a) subjecting the metal contaminated spent zeolite catalyst or regenerated zeolite catalyst to an ammonium wash; and
(b) removing potassium from the metal contaminated spent catalyst or regenerated catalyst to render a re-activated zeolite catalyst, wherein the surface area, pore volume and/or bulk density of the metal contaminated spent zeolite catalyst or regenerated zeolite catalyst is substantially the same as the surface area, pore volume and/or bulk density of the re-activated zeolite catalyst.

* * * * *